May 1, 1923.
G. S. LANE
VEHICLE BRAKE DEVICE
Filed June 4, 1921
1,453,509
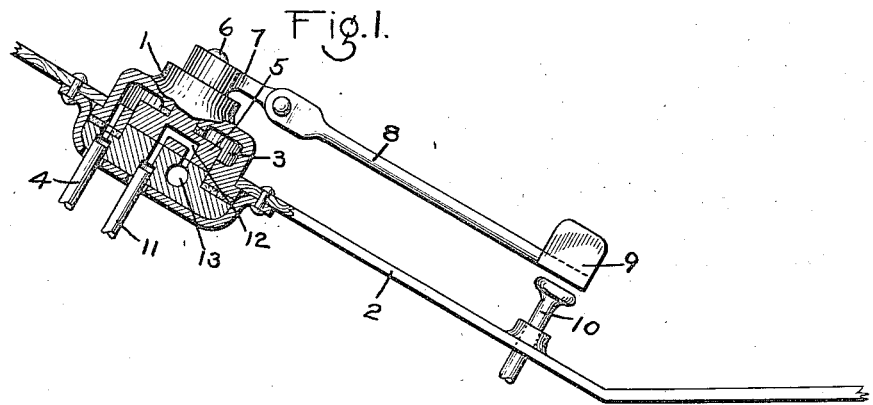
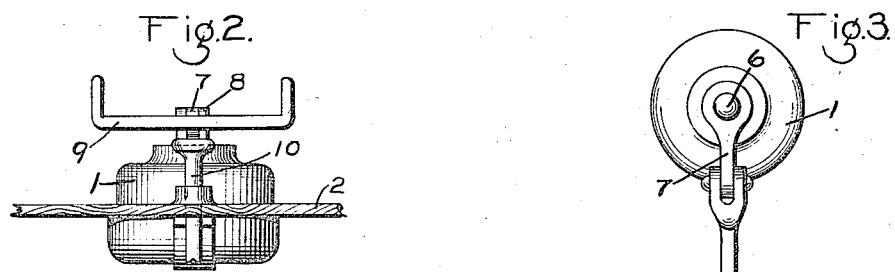
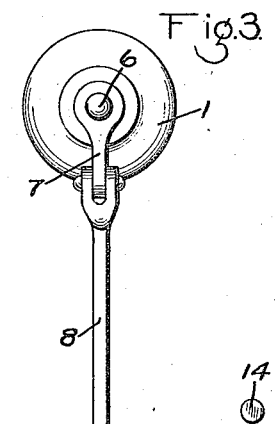
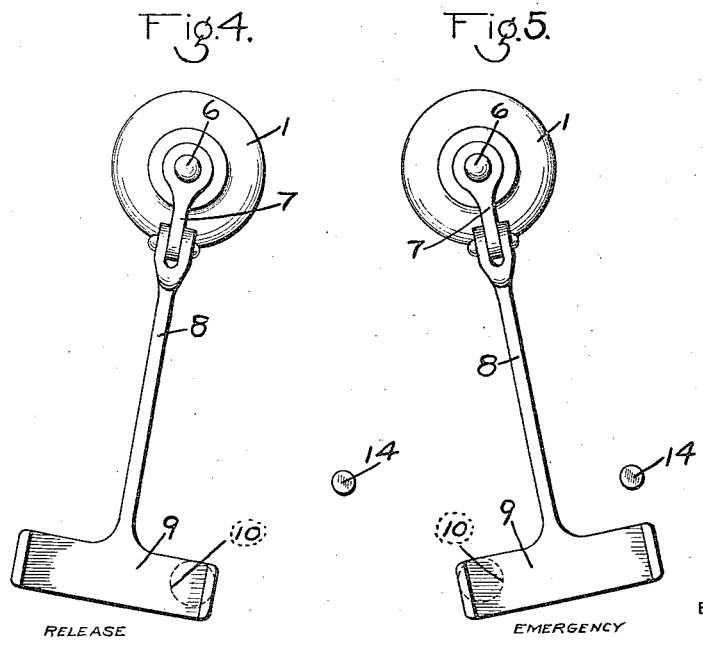
INVENTOR
GEORGE S. LANE
BY *Wm. M. Cady*
ATTORNEY Patented May 1, 1923.

1,453,509

UNITED STATES PATENT OFFICE.

GEORGE S. LANE, OF SAN FRANCISCO, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE DEVICE.

Application filed June 4, 1921. Serial No. 474,984.

*To all whom it may concern:*

Be it known that I, GEORGE S. LANE, a citizen of the United States, residing at San Francisco, in the county of San Francisco and State of California, have invented new and useful Improvements in Vehicle Brake Devices, of which the following is a specification.

This invention relates to brakes, and more particularly to a device for controlling the brakes on a motor vehicle.

The principal object of my invention is to provide an improved brake controlling device for motor vehicles, in which the power and the brakes are controlled by the same operating means.

Other objects and advantages will appear in the following more detailed description of the invention.

In the accompanying drawing; Fig. 1 is a side elevation, partly in section, of a combined brake and power controlling device embodying my invention; Fig. 2 an end elevation thereof; and Figs. 3, 4, and 5 plan views, showing the device in the respective positions of service application, release, and emergency application.

As shown in the drawing, a preferred construction may comprise a valve device 1 for controlling the application and release of the brakes, which may be applied to the foot board 2 of the motor vehicle.

Said valve device may comprise a casing having a valve chamber 3, connected to a fluid pressure supply pipe 4 and containing a rotary valve 5. The stem 6 of the valve 5 is provided with an operating arm 7 which is pivotally connected to a treadle 8.

The foot piece 9 of the treadle is located over the usual foot throttle button 10, so that pressure applied to the treadle will depress the button.

The valve device 1 may be designed to control any desired type of fluid pressure brake and is shown in the drawing as arranged for a straight air brake, in which a pipe 11 connected to the brake cylinder leads to the seat of the rotary valve 5 and in the release position, said pipe is connected by a cavity 12, in the valve, with an exhaust port 13.

In service position, the brake cylinder pipe 11 is connected to a through port in the valve 5, so that fluid under pressure is supplied from the valve chamber 3 to the brake cylinder pipe 11 and in emergency position, fluid is supplied to pipe 11 at the maximum rate.

In operation, the treadle 8 is normally maintained in the release position, as shown in Fig. 4, in which the brake cylinder is connected to the exhaust through the cavity 12 in the rotary valve 5 and the exhaust port 13.

If it is desired to effect a service application of the brakes, the treadle 8 is shifted laterally to the position shown in Fig. 3, in which fluid under pressure is supplied to the brake cylinder, and if the brakes are to be applied with maximum pressure, the foot treadle is moved laterally to the emergency position, as shown in Fig. 5.

It will be noted that in all positions of the treadle, the foot piece 9 is adapted to engage the throttle button 10, so that by depressing the foot piece, the throttle button may be operated to control the supply of power for operating the motor vehicle, so that the brakes can be held applied and the engine accelerated at the same time with one foot and the brakes may also be released and the engine accelerated.

The starter button 14 may be so located that, particularly in service and emergency positions, the button may be operated by the foot without removing the foot from the foot piece.

Having now described my invention, what I claim as new and desire to secure by Letters Patent, is:

1. The combination of a valve device for controlling the brakes of a motor vehicle, means for controlling the power, and a foot operated member for independently operating either said valve device or said means.

2. The combination of a valve device for controlling the brakes of a motor vehicle, a depressible button for controlling the power, and a member movable laterally by the foot for operating said valve device and vertically for operating said button.

3. The combination of a valve device for controlling the fluid pressure brakes of a motor vehicle, a throttle button adapted to be depressed for controlling the power, and a foot treadle for operating said valve device upon a lateral movement thereof and for operating said button upon vertical movement in any lateral position of the treadle.

In testimony whereof I have hereunto set my hand.

GEORGE S. LANE.